(12) United States Patent
Anderson et al.

(10) Patent No.: US 6,408,579 B1
(45) Date of Patent: Jun. 25, 2002

(54) THIN PANEL BEAM

(75) Inventors: Craig M. Anderson, Kentwood; Douglas B. MacDonald, Caledonia, both of MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 09/558,552

(22) Filed: Apr. 25, 2000

(51) Int. Cl.⁷ ............................. E04B 2/76; E04C 2/52
(52) U.S. Cl. ................................................... 52/220.7
(58) Field of Search ............................ 52/220.7, 238.1, 52/239

(56) References Cited

U.S. PATENT DOCUMENTS

| | | |
|---|---|---|
| 1,876,528 A | 9/1932 | Walters |
| 4,535,577 A * | 8/1985 | Tenser et al. ............... 52/238.1 |
| 4,709,517 A | 12/1987 | Mitchell et al. |
| 4,716,698 A | 1/1988 | Wilson et al. |
| 4,757,657 A | 7/1988 | Mitchell et al. |
| 5,175,969 A | 1/1993 | Knauf et al. |
| 5,195,286 A | 3/1993 | DeLong et al. |
| 5,219,406 A | 6/1993 | Raz |
| 5,277,005 A | 1/1994 | Hellwig et al. |
| 5,406,760 A | 4/1995 | Edwards |
| 5,433,046 A | 7/1995 | MacQuarrie et al. |
| 5,495,952 A * | 3/1996 | Kainz ........................... 52/239 |
| 5,642,593 A | 7/1997 | Shieh |
| 5,813,178 A | 9/1998 | Edwards |
| 5,881,518 A | 3/1999 | Edwards et al. |
| 5,899,035 A | 5/1999 | Waalkes et al. |
| 5,913,787 A | 6/1999 | Edwards |
| 6,003,273 A | 12/1999 | Elsholz et al. |
| 6,009,675 A | 1/2000 | Waalkes et al. |

* cited by examiner

*Primary Examiner*—Michael Safavi
(74) *Attorney, Agent, or Firm*—Price, Heneveld, Cooper, DeWitt & Litton (57) ABSTRACT

A frame construction for an office partition panel system includes a pair of spaced-apart generally upright posts, and at least one generally horizontal member extending between and rigidly interconnecting the upright posts. The upright posts define substantially parallel planes separated by a thickness of the upright posts, and the generally horizontal member lies between the parallel planes and has a thickness which is less than the thickness of the upright posts to permit vertical routing of utility lines.

18 Claims, 9 Drawing Sheets

THIN PANEL BEAM

BACKGROUND OF THE INVENTION

The present invention relates to a frame for an office partition system for open office plans and the like, and in particular to a partition having a narrow or thin beam that permits vertical routing of utility lines within the partition panel.

Modern offices are becoming increasingly complicated and sophisticated due largely to the ever increasing needs of the users for improved utilities support at each workstation, such as communications, computers and other types of data processors, electronic displays, etc., including physical accommodations, such as lighting, HVAC, security, and the like. For example, modern offices for highly skilled "knowledge workers" such as engineers, accountants, stockbrokers, computer programmers, etc. are typically provided with multiple pieces of very specialized computer and communications equipment that are capable of processing information from numerous local and remote data sources to assist in solving complex problems. Such equipment has very stringent power and signal requirements, and must quickly and efficiently interface with related equipment at both adjacent and remote locations. Work areas with readily controllable lighting, HVAC, sound masking, and other physical support systems are also highly desirable to maximize worker creativity and productively. Many other types of high technology equipment and facilities are presently being developed which will find their place in the workplaces of the future.

One important consequence of the advent of sophisticated electronic offices is the increased need and desirability for distributing utilities throughout the various offices in a manner which can be readily reconfigured. The term "utilities" as used herein incorporates a wide variety of facilities for use at a workstation, including security devices, electrical power, signal and/or communications, HVAC, water and other fluids, and other similar resources. The ability to provide the worker with ready access to all of these utilities is clearly advantageous in the quest to promote worker wellbeing and effectiveness.

The efficient use of building floor space is also an ever-growing concern, particularly as building costs continue to escalate. Open office plans have been developed to reduce overall officing costs, and generally incorporate large, open floor spaces in buildings that are equipped with modular furniture systems which are readily reconfigurable to accommodate the ever changing needs of a specific user, as well as the divergent requirements of different tenants. One arrangement commonly used for furnishing open plans includes movable partition panels that are detachably interconnected to partition off the open spaces and individual workstation and/or offices. Such partition panels are configured to receive hang-on furniture units, such as worksurfaces, overhead cabinets, shelves, etc., and are generally known in the office furniture industry as "systems furniture". Another arrangement for dividing and/or partitioning open plans includes modular furniture arrangements, in which a plurality of differently shaped, freestanding furniture units are positioned in a side-by-side relationship, with upstanding privacy screens attached to at least some of the furniture units to create individual, distinct workstations and/or offices. Both of these types of modular furniture systems, as well as others, have been widely received due largely to their ability to be readily reconfigured and/or moved to a new site, since they are not part of a permanent leasehold improvement.

In order to gain increased efficiency in the use of expensive office real estate, attempts are now being made to try to support high paid knowledge workers with these types of modular furniture systems in open office settings, instead of conventional private offices. However, in order to ensure peak efficiency of such knowledge workers, the workstations must be equipped with the various state-of-the-art utilities and facilities discussed above. Since such workstations must be readily reconfigurable to effectively meet the ever-changing needs of the user, the distribution and control of utilities throughout the comprehensive open office plan has emerged as a major challenge to the office furniture industry.

At present, some types of modular furniture systems, such as a selected portable partition panels and the freestanding furniture units can be equipped with an optional powerway, which extends along the entire width of the unit, and has quick disconnect connectors adjacent opposite ends thereof to connect with adjacent, like powerways, and thereby provide electrical power to an associated furniture group or cluster. Cable troughs or channels are also provided in most such furniture units, so as to form a system of interconnected raceways into which signal and communications wires can be routed. While this type of distribution system has proven somewhat effective, such systems may have limited capability in terms of providing utility infeed from a ceiling height and/or from a floor height.

SUMMARY OF THE INVENTION

One aspect of the present invention is to provide a frame construction for an office partition panel system. The frame includes a pair of spaced-apart generally upright posts, and at least one generally horizontal member extending between and rigidly interconnecting the upright posts. The upright posts define substantially parallel planes separated by a thickness of the upright posts, and the generally horizontal member lies between the parallel planes and has a thickness which is less than the thickness of the upright posts to permit vertical routing of utility lines.

Another aspect of the present invention is a partition for offices including a knock-down frame having a pair of spaced-apart upright posts having first threadless quick connectors thereon. The knock-down frame also includes upper and lower beams extending between the posts, the beams having second threadless quick connectors on opposite ends thereof rigidly interconnected with the first threadless quick connectors to form a rigid panel frame having an open interior space for routing of utility lines. A cover panel is attached to the frame and closes off at least a portion of the interior space. The upright posts define substantially parallel planes separated by a thickness of the posts, and at least one of the upper and lower beams lies between the parallel planes and has a thickness less than the posts to define a gap between the beam and the cover panel to permit vertical routing of utility lines within the interior space.

Yet another aspect of the present invention is a partition panel for offices including a panel frame having a generally rectangular perimeter and parallel, horizontally spaced-apart vertical side faces and an open interior space that permits internal routing of utility lines. At least one cover panel secured to the panel frame and closes off the open interior space. The panel frame has a horizontal member disposed between the vertical side faces, and the horizontal member has a side face spaced inwardly from the cover panel to form a gap therebetween vertical routing of utility lines through the gap.

These and other advantages of the invention will be further understood and appreciated by those skilled in the art by reference to the following written specification, claims, and appended drawings.

DETAILED DESCRIPTION OF THE PREFERRED EMBODIMENT

Figure 1:
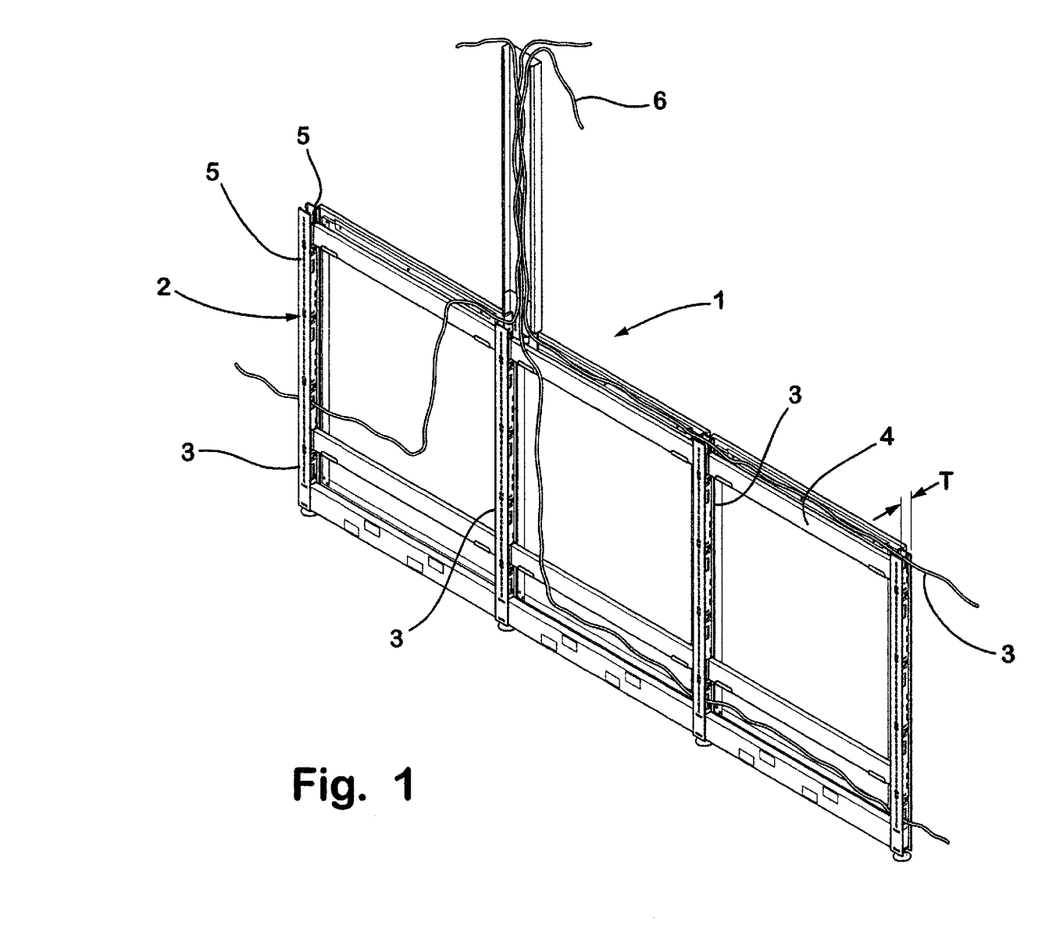
FIG. 1 is a perspective view of a partition according to the present invention illustrating the thin beam and internal routing of utilities.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates a partition panel system embodying the present invention, which is particularly designed for use in open office plans, and other similar settings and environments. In the illustrated example, the partition 1 includes a partition frame 2 having a pair of spaced-apart generally upright posts 3. At least one generally horizontal member such as a beam 4 extends between and rigidly interconnects the upright posts 3 having side faces 5 that define substantially parallel plans separated by a thickness "T" of the upright posts. The "thin" beam 4 has a thickness which is less than the thickness "T" of the upright posts 3 to permit vertical routing of utility lines 6 within the partition 1.

Figure 2:
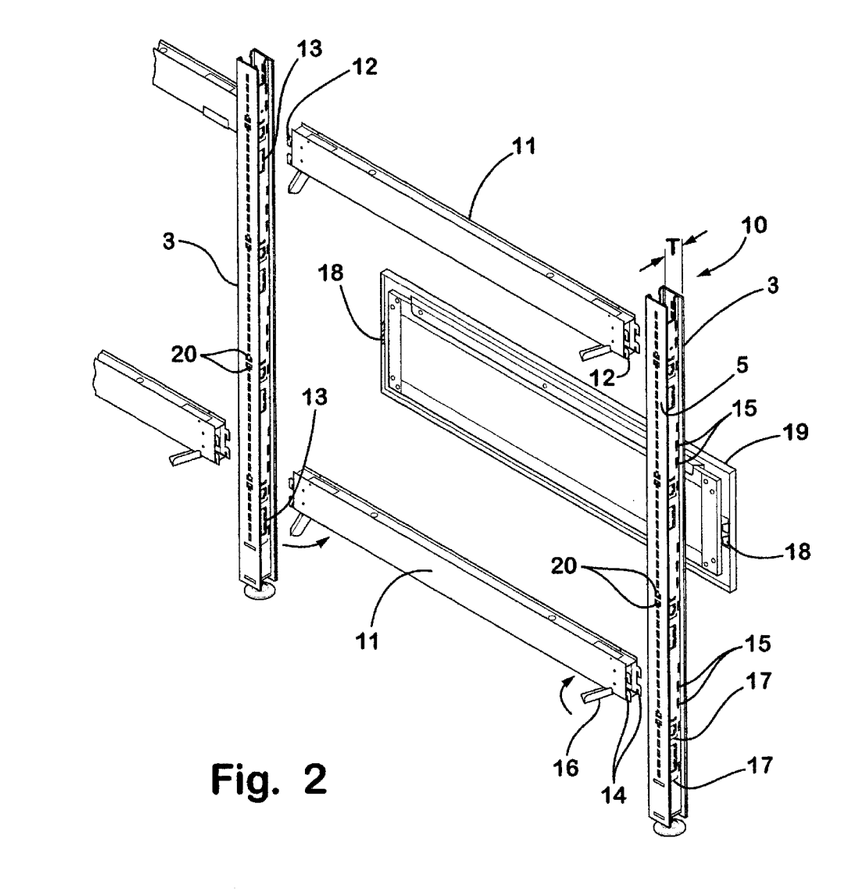
FIG. 2 is a partially fragmentary, exploded perspective view of an existing partition frame having full width beams that do not permit vertical routing of utilities.
Figure 3:
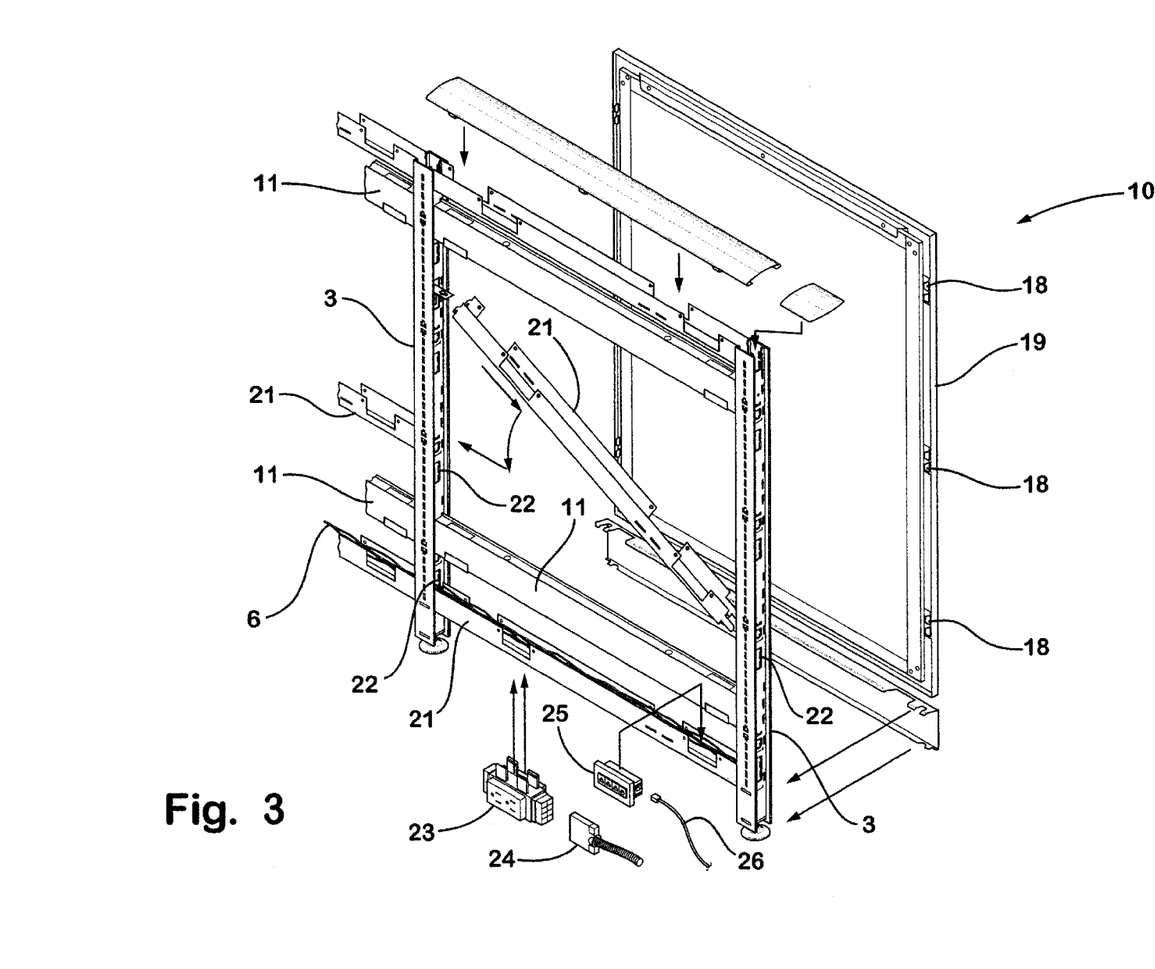
FIG. 3 is a partially fragmentary, exploded perspective view of the partition frame of FIG. 2, including utility troughs and panel trim pieces.

With reference to FIG. 2, an existing Steelcase ANSWER partition frame 10 includes upright posts 3 and upper and lower "standard" width beams 11 that have a width or thickness that is approximately equal to the width "T" of the posts 3. Each beam 11 includes a threadless quick-disconnect connector arrangement 12 on each opposite end of the beam 11 that engages a connection port 13 on posts 3 to rigidly interconnect the post and beam and form a rigid partition frame 10 having a knock-down construction that can be quickly and easily assembled and/or disassembled as required at the installation site. The partition frame 10 is described in detail in U.S. Pat. No. 6,098,358, entitled KNOCK-DOWN PORTABLE PARTITION SYSTEM, issued Aug. 8, 2000, the entire contents of which are hereby incorporated herein by reference. Related partition frames are also disclosed in U.S. Pat. No. 5,899,035, entitled KNOCK-DOWN PORTABLE PARTITION SYSTEM, issued May 4, 1999, and U.S. Pat. No. 6,009,675, entitled KNOCK-DOWN PORTABLE PARTITION SYSTEM, issued Jan. 4, 2000, each of which is hereby incorporated herein by reference. Each connection port 13 includes a plurality of slots 15 that receive hooks 14 of beam 11. Beam 11 is then shifted downward slightly to fully engage hooks 14, and a moving lock member 16 is rotated to a locked position wherein a portion of lock member 16 engages an aperture 17 of beam connection port 14. One or more cover panels 19 include retainer clips 18 that engage openings 20 in posts 3 to removably retain the cover panel 19 on the posts 3. With further reference to FIG. 3, the frame 10 may include a plurality of utility troughs 21 for horizontal routing of utility lines within the partition 10. The utility lines 6 may be passed through relatively large openings 22 in posts 3. Power receptacles 23 and power lines 24, as well as communications receptacle 25 and communications line 26 may be provided for power and communications purposes.

Figure 4:
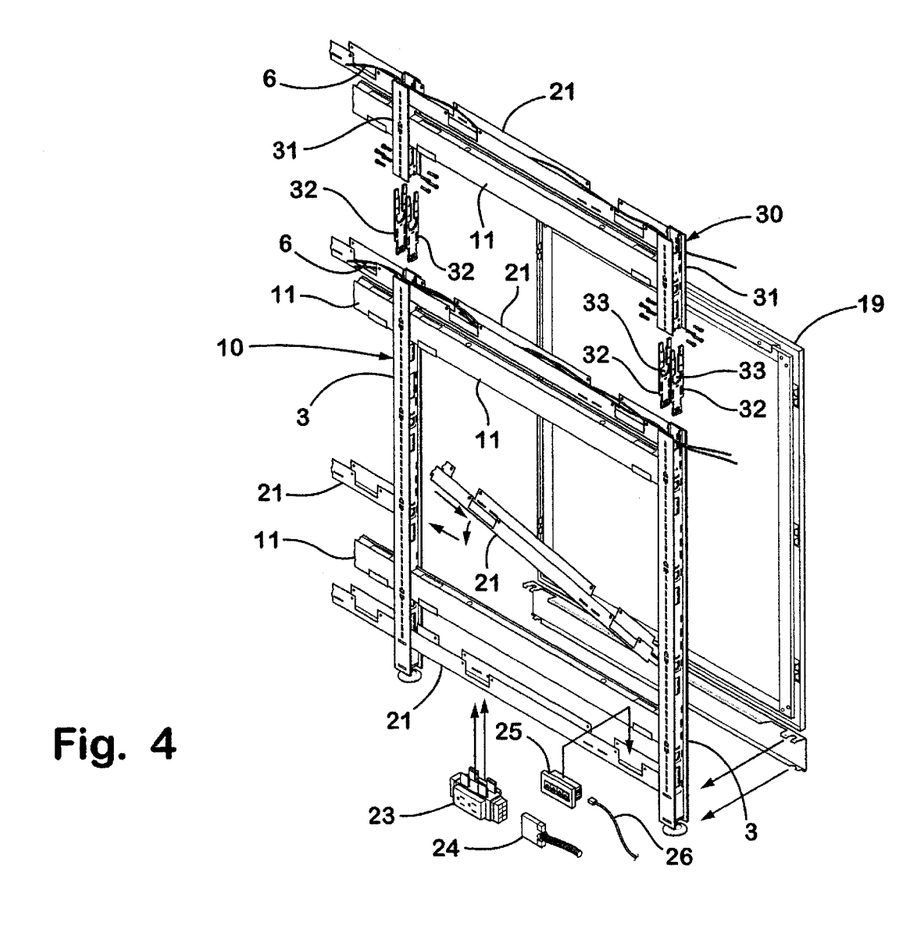
FIG. 4 is a partially fragmentary, exploded perspective view of the partition frame of FIGS. 2 and 3, and further including an extension or "stacker" extension frame and bracket arrangement.

With further reference to FIG. 4, partition frame 10 may include an extension or "stacker" frame 30 to provide additional partition height and privacy as required for a particular application. Extension frame 30 is described in detail in co-pending U.S. patent application Ser. No. 09/364,746, entitled "STACKING CONNECTOR FOR PARTITIONS", filed Jul. 30, 1999, the entire contents of which are incorporated herein by reference. Extension frame 30 includes extension posts 31 that are connected to the lower posts 3 by brackets 32. Brackets 32 have U-shaped openings 33 for pass-through of utility lines 6. As discussed in more detail below, the "thin" beam 4 can be interchanged with one or more of the standard width beams 11, such that the extension frame 30 could include the thin beam 4, and the lower frame 10 could also include an upper thin beam 4 rather than the standard width beam 11. The thin beam 4 may be utilized rather than the standard width beam 11 at any height location throughout the lower frame 10 and/or extension frame 30, as required to provide vertical internal routing of utilities lines for a particular application.

Figures 5, 6:
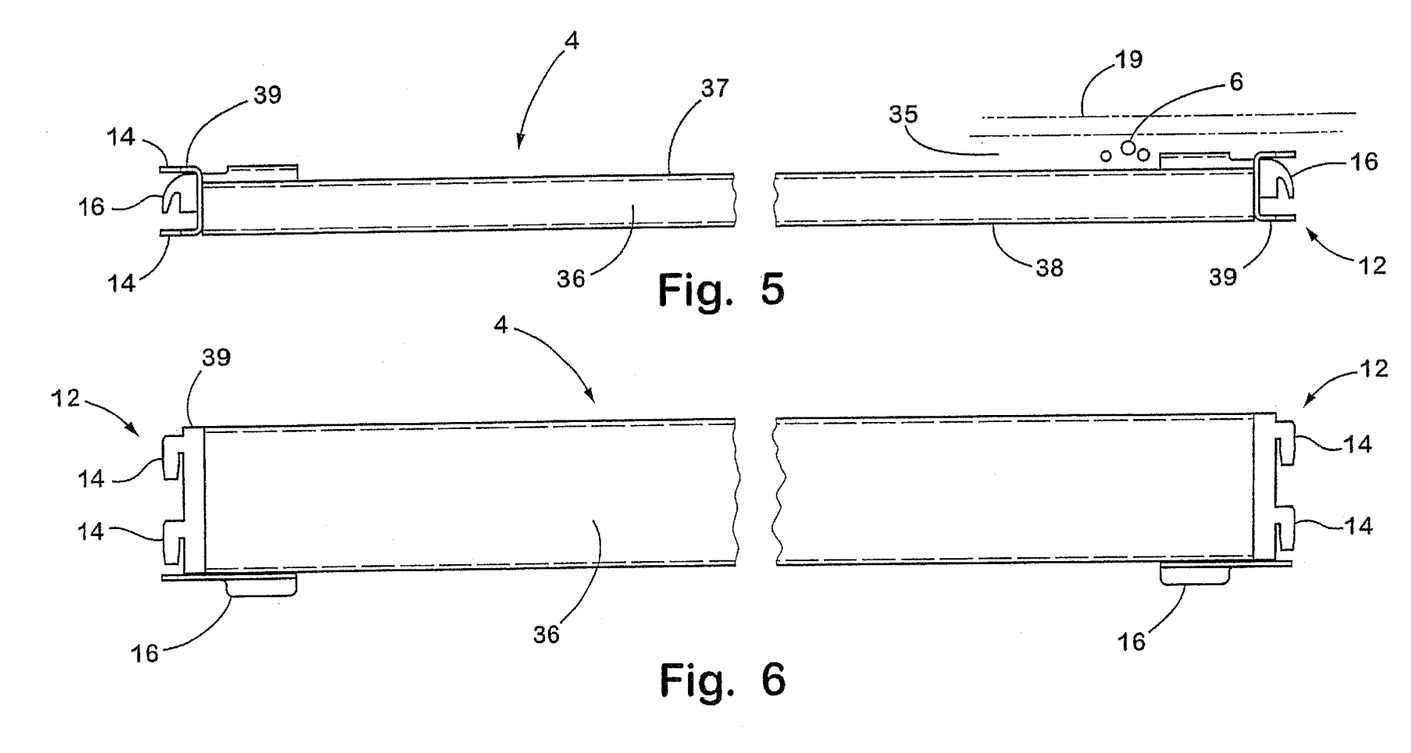
FIG. 5 is a fragmentary, top plan view of a thin beam according to the present invention.
FIG. 6 is a fragmentary, front elevational view of the thin beam of FIG. 5.

With further reference to FIGS. 5 and 6, thin beam 4 includes a main body portion 36 which is offset to form a gap 35 between the first side surface 37 of beam 4 and a cover panel 19 for vertical routing of utility lines 6 through gap 35. When assembled, the second side surface 38 is closely adjacent a cover panel 19. Each thin beam 4 includes a quick connector 20O arrangement 12 that is substantially the same as the arrangement disclosed in above-referenced U.S. Pat. No. 6,098,358. Quick connectors 12 include a plurality of hooks 14 and a movable lock member 16 that is rotated to a locked position to ensure that the hooks 14 remain engaged and provide a rigid interconnection between the beam 4 and the posts 3 (FIGS. 1–4). The main body portion 36 of thin beam 4 has a rectangular tubular construction with a substantially uniform cross-section along the length of the main body portion 36. Hooks 14 are formed on end piece 39 having a U-shape in plan view (FIG. 5). U-shaped member 39 is welded or otherwise secured to the main body portion 36. The components of thin beam 4 are preferably made of metal or other material having sufficient structural strength.

Figure 7:
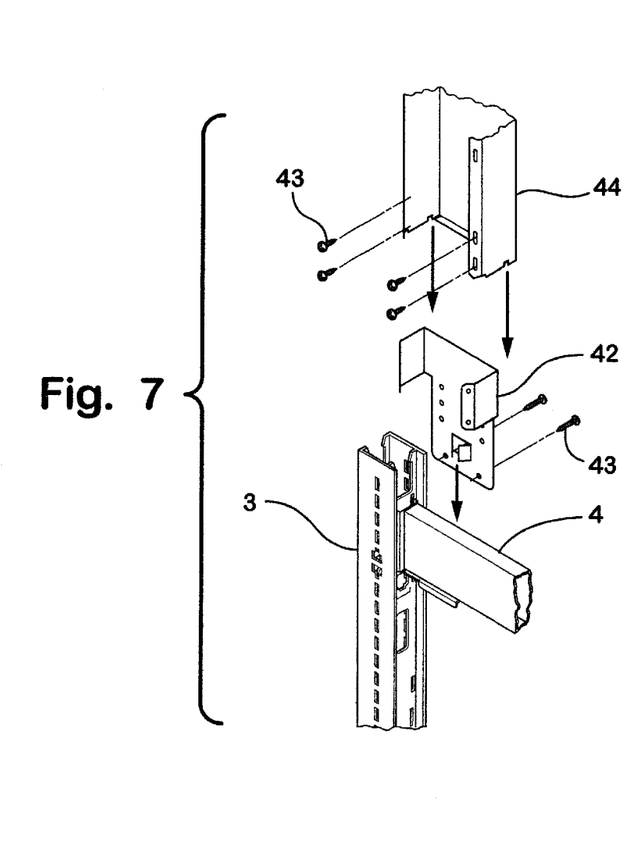
FIG. 7 is a partially fragmentary, exploded perspective view of a utilities infeed pole and mounting bracket arrangement.
Figure 8:
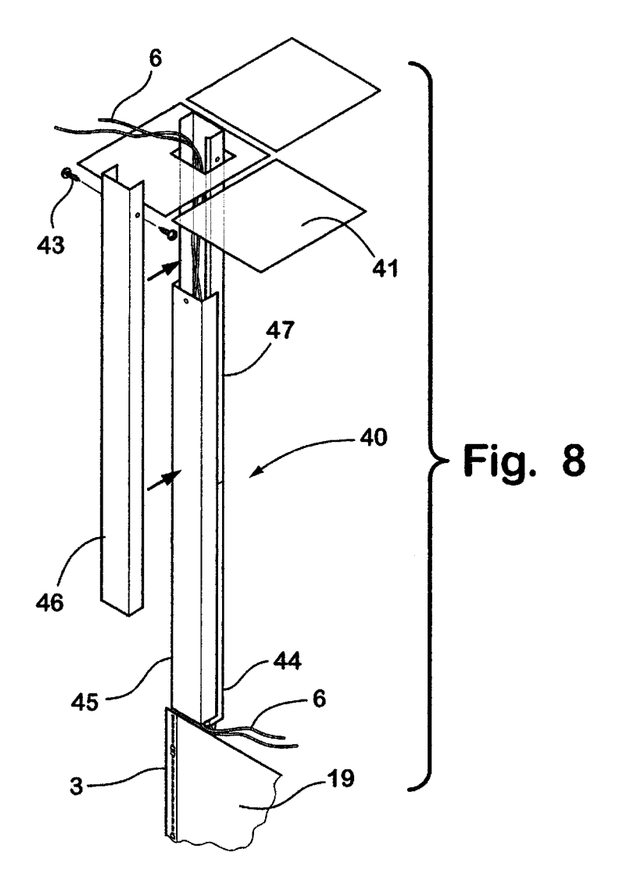
FIG. 8 is a fragmentary, perspective view of the utilities infeed pole of FIG. 7.
Figure 9:
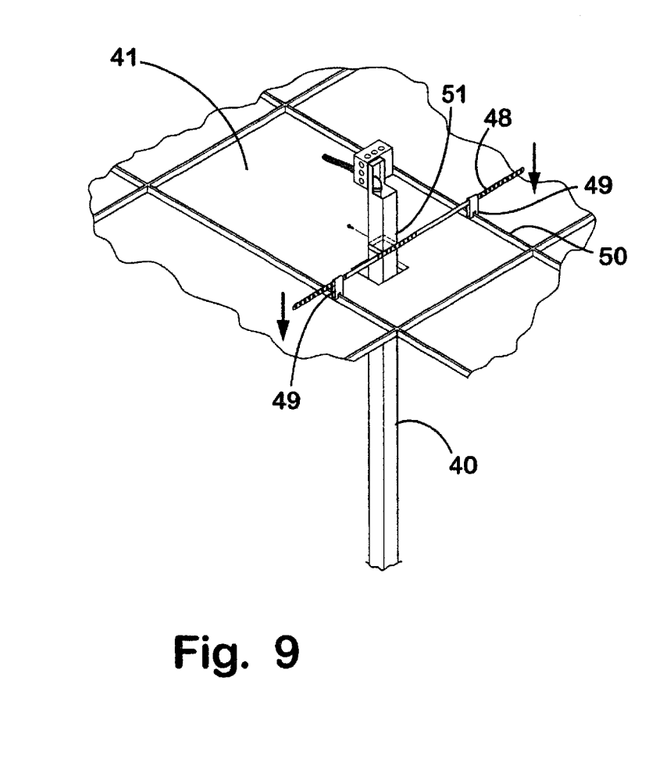
FIG. 9 is a partially fragmentary, perspective view of the utilities infeed pole of FIG. 7.
Figure 10:
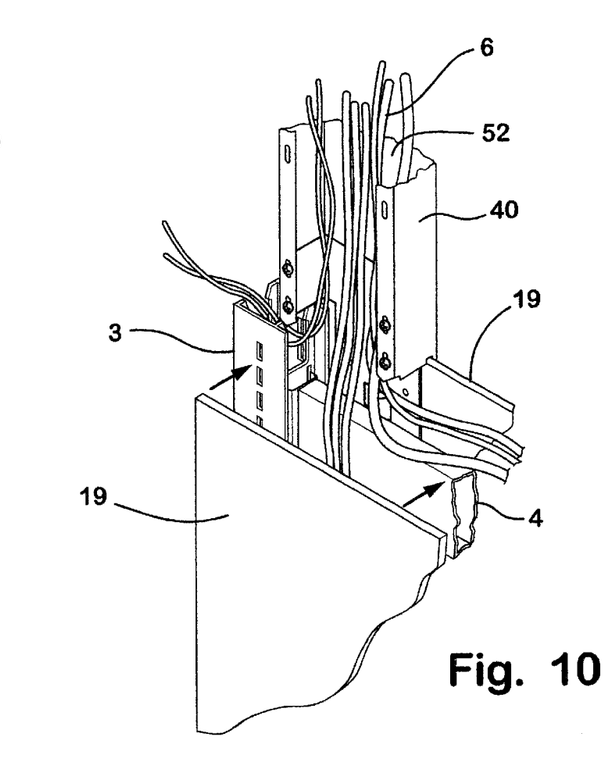
FIG. 10 is a partially fragmentary, partially exploded perspective view of the utilities infeed pole of FIG. 7 illustrating the routing of utility lines.

With reference to FIGS. 7 and 8, a utilities infeed pole 40 can be secured to the thin beam 4 to provide infeed of utility lines 6 from above a ceiling 41. Bracket 42 is secured to a thin beam 4 by fasteners 43, and a first elongated U-shaped member 44 is then secured to the bracket 42. An upper U-shaped member 47 fits within the U-shaped member 44 and slides vertically to provide telescopic height adjustment. A second U-shaped member 45 fits over U-shaped members 44 and 47, and another upper U-shaped member 46 fits over the U-shaped member 45, and provides telescopic height adjustment. With further reference to FIG. 9, an elongated member 48 is secured to the ceiling members 50 by a pair of brackets 49. The utilities infeed pole 40 is then secured to the elongated member 48 by another bracket 51. With further reference to FIG. 10, utilities infeed pole 40 forms a vertical passageway 52 for routing of the utility lines 6. The utility lines 6 may be routed downwardly past the thin beam 4, and/or routed horizontally along utility troughs 21, as required for a particular application.

Figure 11:
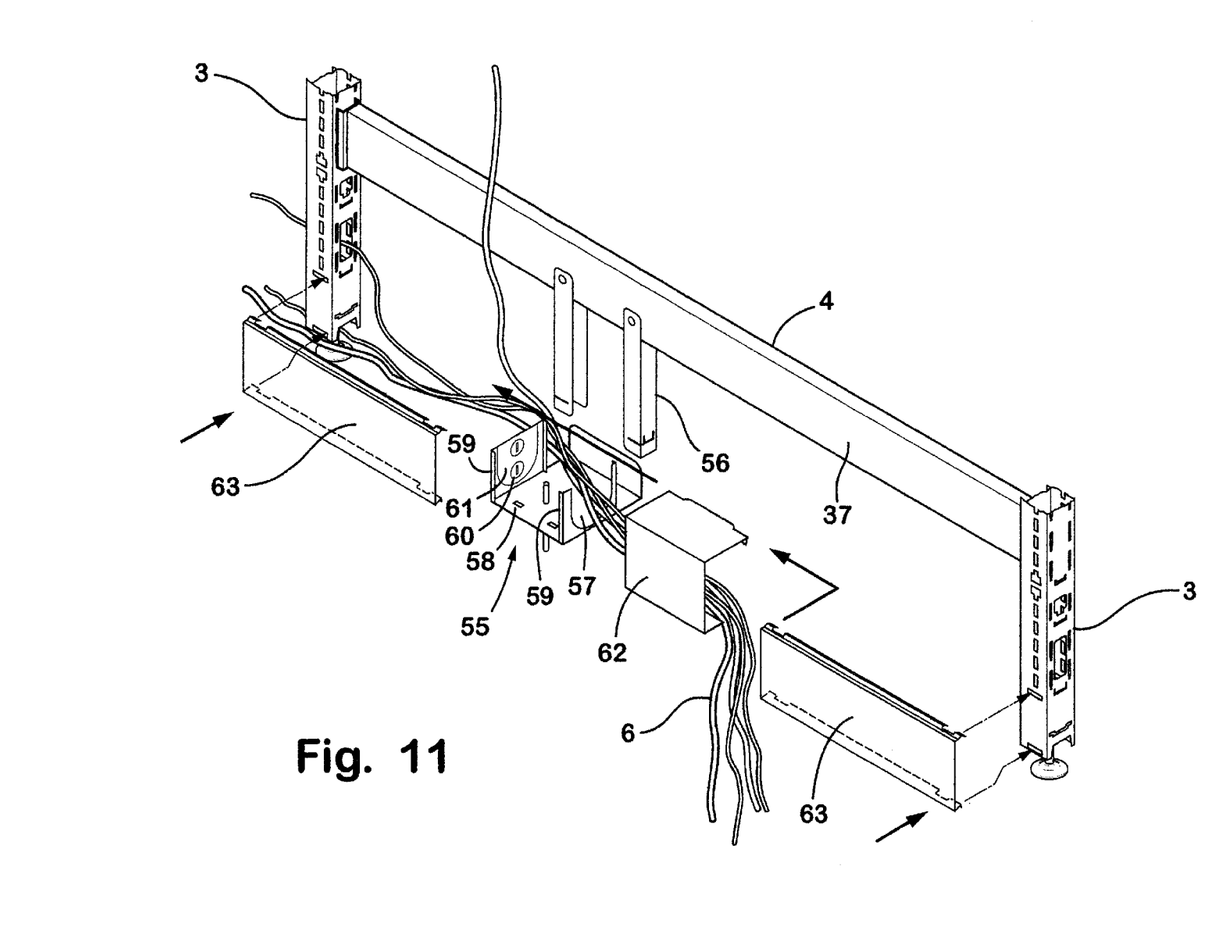
FIG. 11 is a partially fragmentary, exploded perspective view of a floor infeed module.
Figure 12:
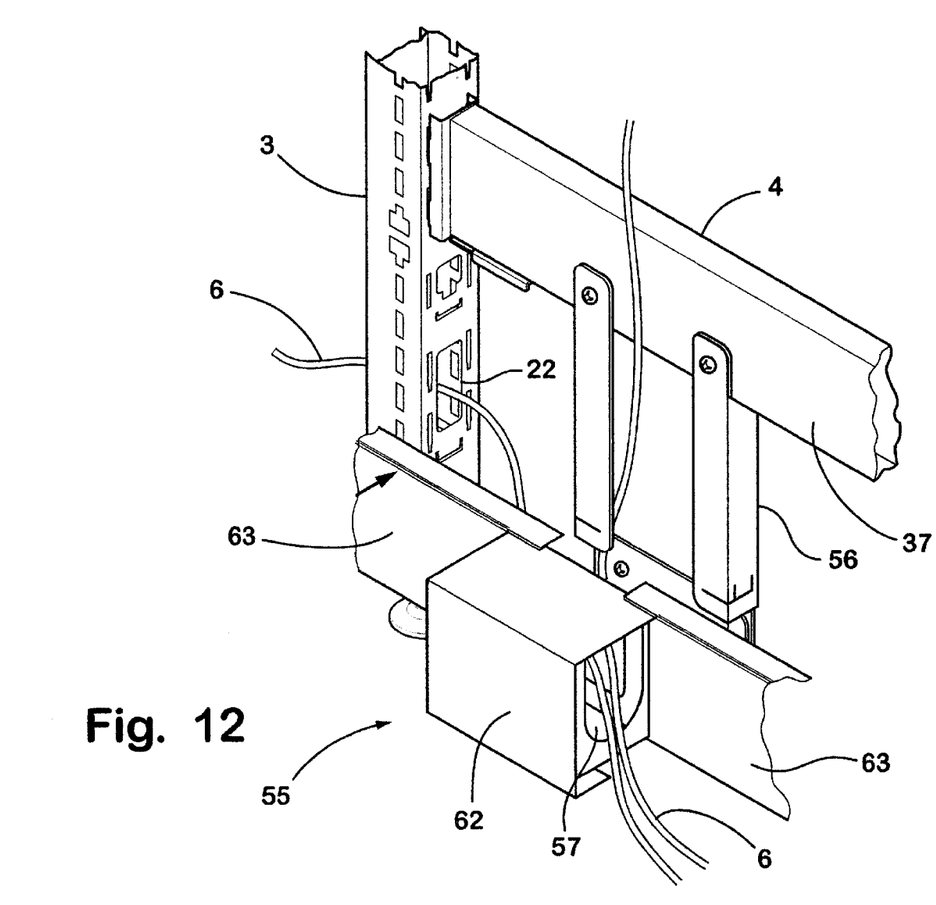
FIG. 12 is a partially fragmentary, perspective view of the floor infeed module of FIG. 11.

With further reference to FIGS. 11 and 12, a floor infeed module 55 is secured to a lower thin beam 4 by brackets 56. Member 58 of infeed module 55 includes a pair of upright vertical walls 59 having small, circular knock-outs 60 that can be broken out to provide circular openings for routing of relatively small utility lines 6. Alternately, a larger knock-out 61 can be removed from one or both of the vertical sidewalls 59 to provide a relatively large U-shaped opening 57 to provide additional utility routing capabilities. A cover 62 closes off the infeed module 55, and interconnects with base trim pieces 63 to provide a finished appearance. The floor infeed module 55 provides a passageway for routing of the utility lines 6 from external locations to the interior space of the partition. Significantly, the utility lines 6 can be routed vertically past the thin beam 4 across the side face 37 thereof.

The thin beam 4 can be connected to any of the connection ports 13 of posts 3, such that the thin beam 4 may be positioned at a lower portion, a central portion, or an upper edge of the partition frame as required to provide vertical routing of utilities within the partition panel. For example, a standard width beam 11 may be positioned at the lower portion of the partition, and a thin beam 4 could be positioned along the upper edge of the frame to provide utilities infeed in conjunction with an infeed pole 40. Alternately, a standard width beam 11 may be positioned adjacent the upper portion of the frame, and a thin beam 4 may be positioned along the lower edge of the frame to provide utilities infeed through the floor infeed module 55. Alternately, a thin beam 4 may be positioned at both the upper and lower portions of the frame 3 to provide both upper and lower infeed capabilities. Furthermore, the thin beam 4 may be positioned in a central portion of the partition frame to provide vertical utilities routing within the partition itself. Also, as discussed above, an extension frame 30 may include a thin beam 4. An extension frame 30 including a thin beam 4 may be utilized with a base frame having one or more thin beams 4 in the upper and/or lower arrangements discussed above. The thin beam 4 permits routing and/or infeed of a large volume of utility lines 6, thereby providing for the substantial power and communications utilities needs of the users of the office system.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A partition panel for offices, comprising:
    a panel frame having a generally rectangular perimeter and parallel, horizontally spaced-apart vertical side faces and an open interior space that permits internal routing of utility lines;
    at least one cover panel secured to said panel frame and closing off said open interior space;
    said panel frame having a horizontal member disposed between said vertical side faces, said horizontal member having a first side face spaced inwardly from said first cover panel to form a gap therebetween to permit vertical routing of utility lines through said gap, said panel frame having a lower portion configured to support said frame on a floor surface, said horizontal member positioned adjacent said lower portion;
    a utilities infeed module connected to said horizontal member and having an opening to permit routing of utility lines from said open interior space to an office space exterior of said partition panel; and including:
    a bracket rigidly interconnecting said utilities infeed module to said horizontal member and positioning said utilities infeed module below said horizontal member.

2. A frame construction for an office partition panel system, comprising:
    a pair of spaced-apart generally upright posts;
    at least one generally horizontal member extending between and rigidly interconnecting said upright posts to define a freestanding partition frame, said horizontal member having opposed exterior surfaces defining a first thickness; wherein:
    said upright posts define substantially parallel planes separated by a thickness of said upright posts, and wherein said generally horizontal member is positioned asymmetrically relative to said parallel planes, and said first thickness is less than the thickness of said upright posts such that a first one of said exterior surfaces of said horizontal member is spaced apart from a first one of said planes defined by said posts to form a first gap therebetween to permit vertical routing of utility lines through said gap, a second one of said exterior surfaces of said horizontal member positioned proximate a second one of said planes defined by said posts and defining a distance that is less than said gap.

3. The frame construction set forth in claim 2, wherein:
    said horizontal member is attached to said posts using quick-connect attachments.

4. The frame construction set forth in claim 2, wherein:
    said at least one generally horizontal member comprises a first generally horizontal member; and including:

a second generally horizontal member extending between and rigidly interconnecting said posts at a vertically spaced-apart location from said first generally horizontal member.

5. The frame construction set forth in claim 4, wherein: said second horizontal member lies between said parallel planes and has a thickness which is substantially less than the thickness of said posts.

6. The frame construction set forth in claim 4, wherein: said second horizontal member has a thickness that is substantially greater than the thickness of said first horizontal member.

7. The frame construction set forth in claim 2, including: a utilities infeed pole having a vertical raceway for routing of utility lines connected to said horizontal member and extending upwardly to a ceiling height to provide utilities infeed from a ceiling.

8. The frame construction set forth in claim 2, including: an extension frame having a pair of extension posts rigidly connected to said posts and extending upwardly therefrom, said extension frame including an upper horizontal member having a thickness less than the thickness of the posts and extending between and rigidly interconnecting said extension posts.

9. A partition for offices, comprising: a knock-down frame having a pair of spaced-apart upright posts having first threadless quick connectors thereon and upper and lower beams extending between said posts, said beams having second threadless quick connectors on opposite ends thereof rigidly interconnected with said first threadless quick connectors to form a rigid panel frame having an open interior space for routing of utility lines;

a cover panel attached to said frame and closing off at least a portion of said open interior space; and said upright posts defining substantially parallel planes separated by a thickness of said posts and defining a post centerline midway between said parallel planes, and wherein at least one of said upper and lower beams lies between said parallel planes and has first and second opposed side faces defining a beam centerline midway between said side faces, said first and second opposed side faces defining a thickness therebetween that is less than said thickness of said posts, said beam centerline horizontally offset relative to said post centerline and defining a gap between said at least one beam and said cover panel to permit vertical routing of utility lines within said interior space.

10. The partition frame set forth in claim 9, wherein: said beams have a tubular construction with a substantially uniform cross-section shape along the length thereof.

11. The partition frame set forth in claim 9, wherein: said partition defines a horizontally-extending upper edge; and said at least one beam is positioned adjacent said upper edge to permit vertical routing of utilities from within said interior space to a location above said upper edge.

12. The partition frame set forth in claim 11, including: an extension frame positioned above said upper edge, said extension frame defining an upper interior space and including a beam having a thickness less than said posts to permit vertical routing of utilities from said open interior space to said upper interior space.

13. A partition panel for offices, comprising: a panel frame having a generally rectangular perimeter and parallel, horizontally spaced-apart vertical side faces and an open interior space that permits internal routing of utility lines;

first and second cover panels secured to said vertical side faces of said panel frame and closing off said open interior space; and said panel frame having a horizontal member disposed between said vertical side faces, said horizontal member having a first side face spaced inwardly from said first cover panel to form a gap therebetween to permit vertical routing of utility lines through said gap, and a second side face positioned substantially closer to said second cover panel than said first side face is positioned relative to said first cover panel.

14. The partition panel set forth in claim 13, wherein: said panel frame includes a pair of upright posts;

said horizontal member is releasably, yet rigidly interconnected with said posts.

15. The partition panel set forth in claim 14, wherein: said horizontal member has a substantially uniform cross-sectional shape along the length thereof.

16. The partition panel set forth in claim 15, including: a utility trough having an upwardly-opening U-shape extending between said posts for horizontal routing of utility lines within said open interior space.

17. The partition panel set forth in claim 13, wherein: said panel frame has a lower portion configured to support said frame on a floor surface, said horizontal member positioned adjacent said lower portion; and including:
a utilities infeed module connected to said horizontal member and having an opening to permit routing of utility lines from said open interior space to an office space exterior of said partition panel.

18. The partition panel set forth in claim 13, wherein: said horizontal member is positioned adjacent a top edge of said partition panel; and including:
an elongated vertically telescoping tubular ceiling infeed pole having a vertically extending passageway for vertically routing utility lines from a ceiling height to said partition panel.

* * * * *